Oct. 23, 1962 W. J. HARMS ET AL 3,059,962
VEHICLE BODY WITH RETRACTABLE RIGID TOP
Filed March 2, 1960 4 Sheets-Sheet 2
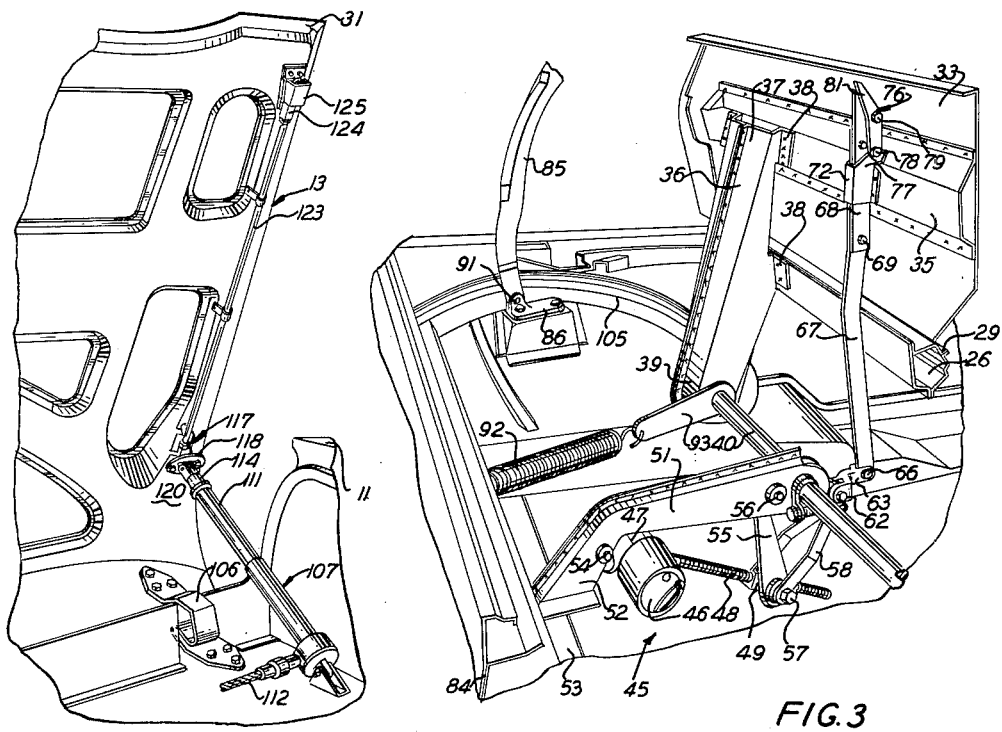
FIG.2
FIG.3
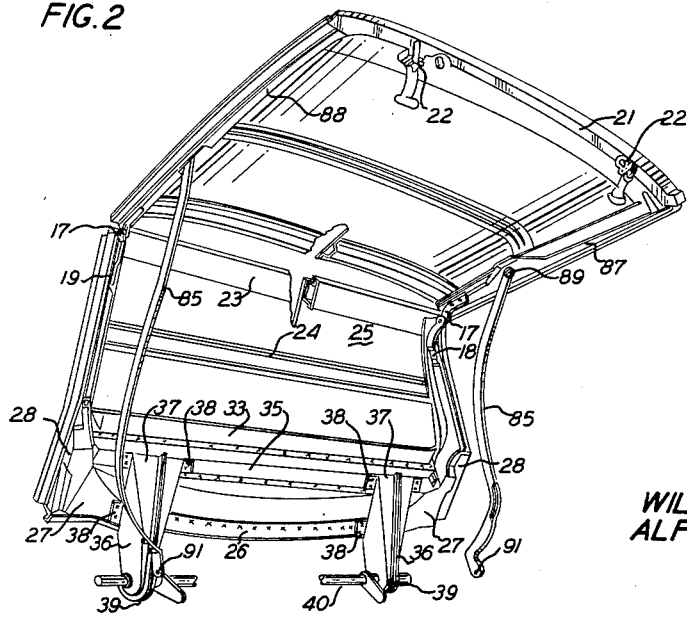
FIG.4
WILLIAM J. HARMS
ALFRED E. LEININGER
INVENTORS
BY John R. Faulkner
John J. Roethel
ATTORNEYS

WILLIAM J. HARMS
ALFRED E. LEININGER
INVENTORS

ATTORNEYS

Oct. 23, 1962  W. J. HARMS ET AL  3,059,962
VEHICLE BODY WITH RETRACTABLE RIGID TOP
Filed March 2, 1960  4 Sheets-Sheet 4

WILLIAM J. HARMS
ALFRED E. LEININGER
INVENTORS

BY *John R. Faulkner*
*John J. Roethel*

ATTORNEYS

United States Patent Office 3,059,962
Patented Oct. 23, 1962

3,059,962
VEHICLE BODY WITH RETRACTABLE RIGID TOP
William J. Harms, Dearborn, and Alfred E. Leininger, Ypsilanti, Mich., assignors to Ford Motor Company, Dearborn, Mich., a corporation of Delaware
Filed Mar. 2, 1960, Ser. No. 12,436
9 Claims. (Cl. 296—117)

This invention relates generally to motor vehicle bodies, and has particular reference to a motor vehicle body having a retractable rigid top structure.

Vehicle bodies of the coupe or two-door type characterized by a rigid metal top structure which may be readily lowered and stored within the vehicle body to the rear of the passenger compartment are well known to the prior art. In some of the earlier vehicle bodies provided with retractable metal top structures, the top structure was relatively short since it was required to cover a passenger compartment having only a single seating area extending the width of the body. These short top structures were generally of single unit construction and the entire top structure was bodily carried into the storage compartment without change in length.

More recently, most convertible vehicles of the coupe or two-door type, whether provided with a fabric top or a metal top, are arranged with front and rear seating areas in the passenger compartment. The top structure is correspondingly elongated. It becomes necessary to provide a hinged sectional top structure whereby at least one section may be folded relative to the section supported on the retracting mechanism to reduce the length of the top prior to its entry into the storage area. An early patent exemplifying this latter construction and arrangement is U.S. Patent 2,007,873. More recently, U.S. Patent 2,860,004 illustrated and described many features of a contemporary vehicle body of the hard top convertible type in which the roof is bodily moved from its raised position to a lowered position for storage beneath the rear deck of the vehicle, a section of the roof being folded as the roof is retracted.

It is an object of the present invention to provide further improvements in hard top convertible type vehicle bodies provided with rigid, sectional foldable top structures. More particularly, the present invention contemplates: (1) an improvement in a supporting structure for the retractable foldable top; (2) an improvement in the linkage system transmitting power from the operating mechanism; (3) the addition of a latching mechanism associated with the retracting mechanism operative to latch the rear section of the top structure when the latter is in raised position; (4) the provision of a package tray structure forming a unitary construction with the rear section of the foldable top; (5) the provision of a simple auxiliary package tray structure effective to close the opening left by the main package tray structure when the latter is retracted with the top structure into the storage compartment; and (6) the provision of a latch mechanism for effectively latching the deck lid covering the storage compartment.

The structure of the present invention is particularly designed to provide a relatively simple trouble-free mechanism maintaining the roof and the rear deck lid under positive and accurate control at all times, resulting in a smoothly operating practical construction. The provision of the latching mechanism associated with the retracting mechanism is designed to ensure that the top structure when in raised position is firmly held at the rear end thereof against any tendency to vibrate or rattle as the vehicle is driven about. The unique construction and arrangement of the main package tray and the auxiliary package tray is designed to avoid any unsightly openings in the body structure whether the top is in a raised or lowered position. The improved roof supporting and retracting mechanism emphasizes rigidity, ease of operation and ease of maintenance or servicing of the power operated mechanism.

Other objects and advantages of this invention will be made more apparent as this description proceeds, particularly when considered in connection with the accompanying drawings, wherein:

FIG. 2 is an enlarged fragmentary perspective view illustrating the deck lid covering the top storage compartment in raised position and more particularly showing the mechanism for raising and lowering the deck lid and the latch mechanism associated therewith;

FIG. 3 is an enlarged fragmentary perspective view illustrating the top structure in partially retracted position and more particularly illustrating the mechanism for raising and lowering the top structure;

FIG. 4 is an enlarged fragmentary perspective view illustrating the top structure in partially collapsed or folded condition;

Figure 1:
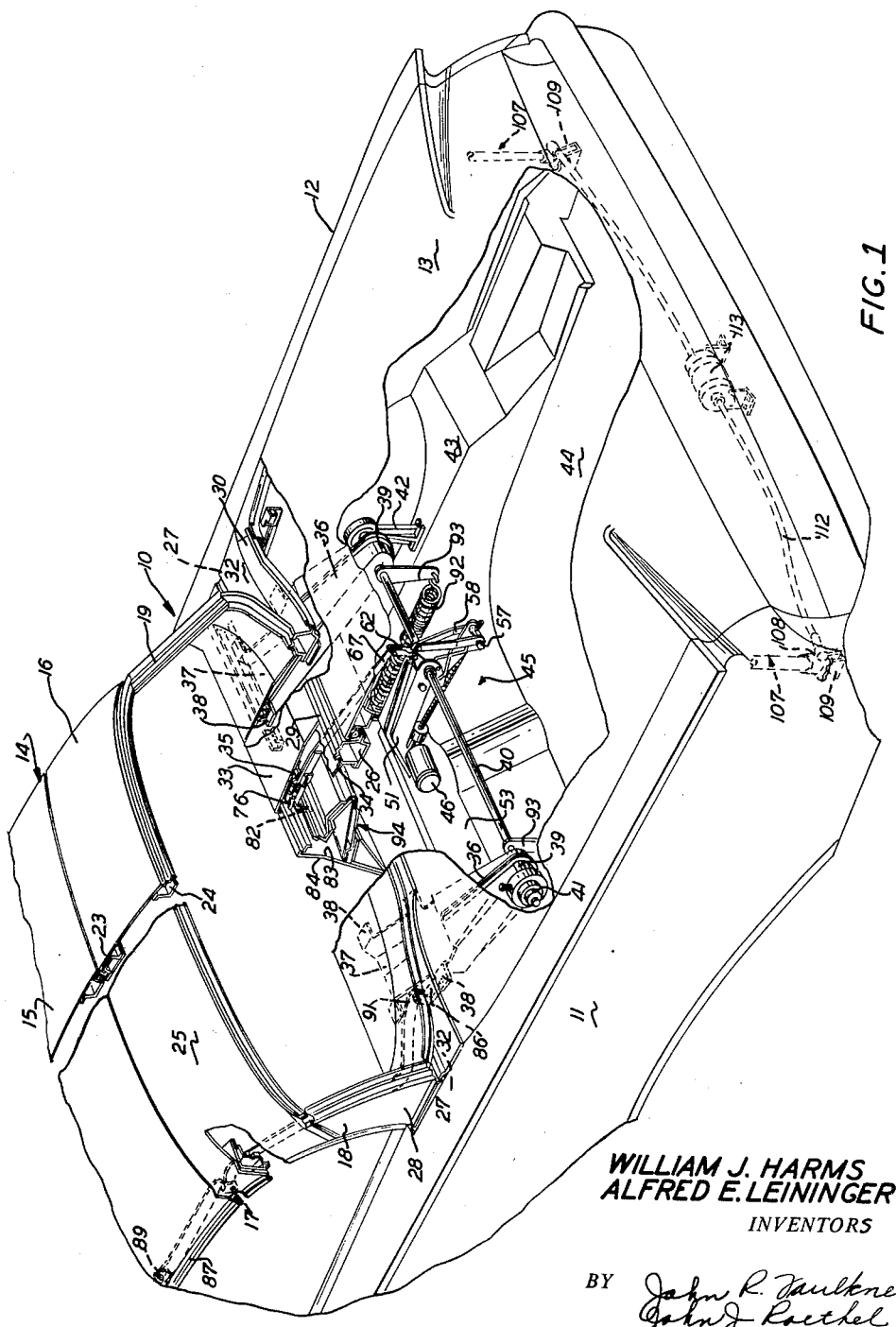
FIG. 1 is a perspective view of a motor vehicle incorporating the present invention, the top structure being shown in its raised position.

Referring now to the drawings, and particularly to FIG. 1, the reference character 10 indicates generally a motor vehicle body incorporating the present invention. The body is somewhat similar to a convertible in that the roof is retractable and is stored within the body, but it is more popularly called a hard top convertible in that the roof is a rigid steel structure.

Only the rear half of the vehicle body 10 is illustrated in FIG. 1. The front half of the vehicle body is conventional and includes the front fenders, hood, curved windshield, windshield header and side doors and the front and rear seats within the passenger compartment. These have all been omitted so that a larger view of the vehicle body components directly related to the top structure embodying the present invention could be presented. Accordingly, FIG. 1 illustrates only the rear quarter panels 11 and 12, the deck lid 13 covering the storage compartment between the rear quarter panels, and the retractable top structure, which may hereinafter be referred to as the roof and is generally designated 14.

The roof 14 is a rigid steel structure comprising a forward or front section 15 and a rear section 16, the two sections being pivotally connected to each other at the sides by simple hinge devices 17 (see FIG. 4). The forward section 15 of the roof is relatively flat and is adapted to cover most of the passenger compartment when in roof raised position. The division line betwen the two sections 15 and 16 is positioned slightly forward of the point at which the side rails 18 and 19 framing the rear section 16 curve sharply downwardly toward the belt line of the vehicle body.

The roof rail 21 defining the forward edge of the forward roof section 15 is provided with suitable latch devices 22 engageable with latch keeper devices (not shown)

carried by the windshield header. Such latch devices, either operable manually or by power operated mechanisms, are conventional and a detailed description is not believed necessary to an understanding of the present invention.

Figure 6:
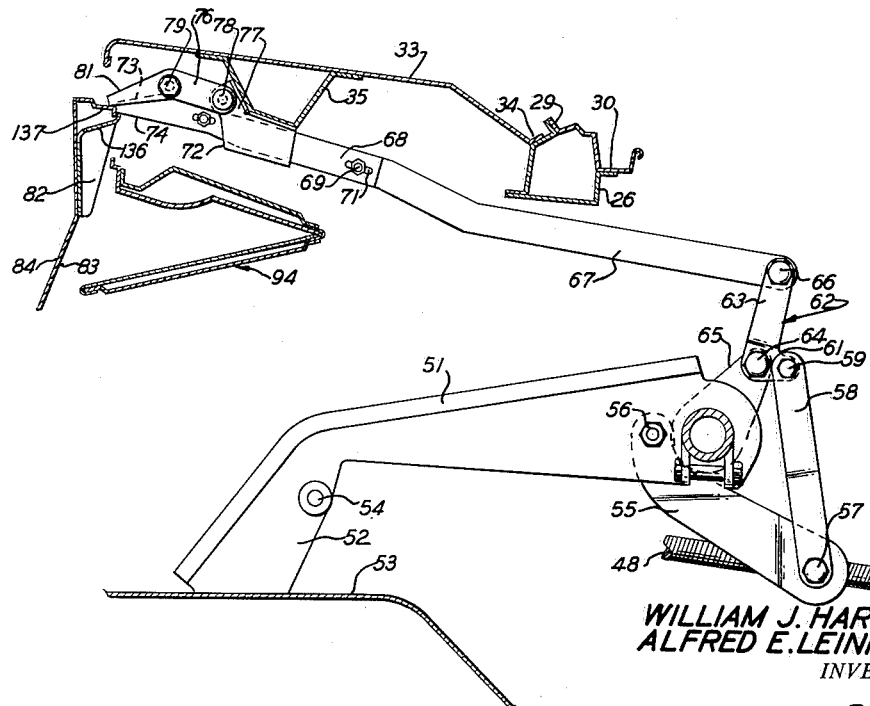

As best seen in FIGS. 1 and 6, the rear roof section 16 comprises a frame work including the side rails 18 and 19. Each side rail is of a box section construction. Each box section increases in width from the forward end toward the rear end. Each side rail curves sharply downwardly to the rear in roof raised position forming cantilever roof supporting structures. The side rails 18 and 19 are welded at their forward ends to a box section roof rail 23 spanning the width of the passenger compartment. A second box section roof rail 24 is welded to the side rails 18 and 19 intermediate their ends. The roof rail 24 parallels the roof rail 23 and defines the upper edge of the opening into which a rear window (not shown) is adapted to be fitted. The portions of the side rails 18 and 19 below the roof rail 24 define the side edges of the same window opening. The roof area defined by the side rails 18 and 19 and the transverse roof rails 23 and 24 is covered by a suitably contoured sheet metal panel 25.

The lower edge of the window opening is defined by a box section structural member 26 of relatively thin cross section beneath the center portion of the window opening. The structural member 26 extends across the width of the body and is provided with forwardly curved end sections 27 underlying the lower end portions 28 of the side rails 18 and 19, respectively. The side rail end portions 28 are spot welded to the curved end sections 27 of the structural member 26, suitable welding flanges and reinforcing brackets, gussets and the like being utilized where required for structural rigidity.

As best seen in FIG. 1, the exposed upper surface of the structural member 26 is provided with a forwardly inclined lip 29 adapted to receive a conventional window glass retaining and sealing device (not shown). Outwardly of the lip 29, the structural member 26 is formed with a trough 30 extending the width of the vehicle body. The trough 30 provides a runoff for water which would otherwise enter the storage compartment through the opening beneath the forward lip or edge 31 of the rear deck lid 13, as will be readily understood. The upper exposed surface 32 of each end portion 27 is contoured to blend into the quarter panels 11 and 12, respectively.

The rear roof section 16 is provided with a package tray comprising a panel 33 extending forwardly of the structural member 26 and spanning the width of the roof section between the side rails 18 and 19. The panel 33 is provided with suitable flanges, as at 34, along which it is spot welded or otherwise securely attached to the structural member 26 and the side rails 18 and 19. The panel 33 is structurally reinforced by a flanged channel structural member 35 which extends beneath the panel 33 across the width of the passenger compartment and is tied in at both ends to the side rails 18 and 19, respectively.

Thus, the roof section 16 comprises a unitized structure in which the side rails 18 and 19, the roof rails 23 and 24, the roof panel 25, the structural member 26, the package tray panel 33, and the structural reinforcing member 35 beneath the package tray panel 33 are all welded into a single integral unit.

The roof structure herein above described is supported for retractable movement on a pair of spaced arms 36. The construction of the arms 36 is best seen in FIGS. 3 and 4. Each arm comprises a sheet metal weldment of substantially box section. Each arm 36 is provided at one end 37 with suitable flanges 38 adapted to be spot welded or otherwise suitably secured to the underside of the parallel structural members 26 and 35. Projecting through the other end 39 of each arm 36 is a torque tube or shaft 40. The arms 36 are welded or otherwise coupled to the tube or shaft 40 so that rotation of the tube or shaft is necessarily accompanied by swinging movement of the arms 36.

The torque tube or shaft 40 is rotatably journaled outwardly of the arms 36 in bearings 41 carried in support members 42 bolted to the floor 43, of the rear storage compartment 44 of the vehicle body 10.

Figure 5:
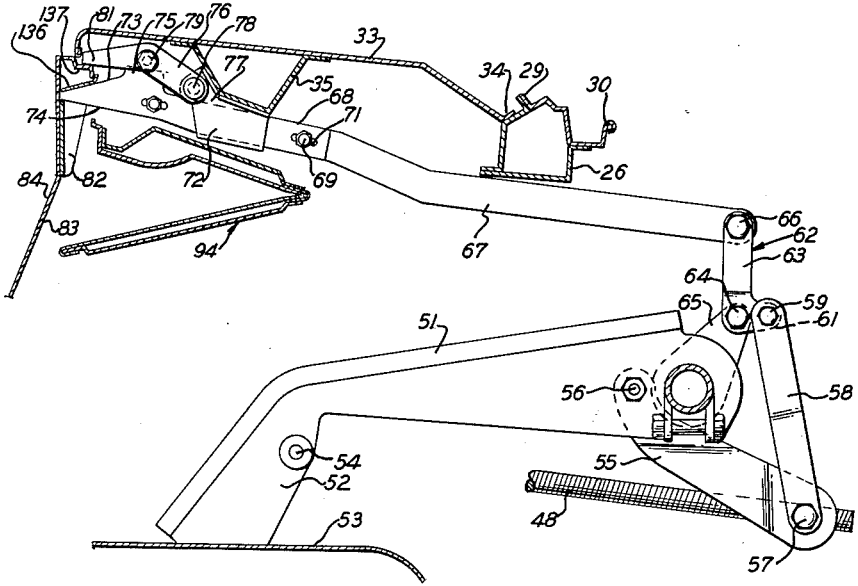
FIGS. 5 and 6 are enlarged views in part sectional and in part elevational illustrating the latch mechanism associated with the top retracting mechanism for latching the rear section of the top structure when in raised position, the two views illustrating different stages in the operation of the latch mechanism.

Rotational movement is imparted to the torque tube or shaft 40 through a power unit comprising an electric motor driven jackscrew and traveling nut mechanism, as best seen in FIGS. 3, 5 and 6. The power unit, generally designated 45, is located substantially on the longitudinal center line of the vehicle body. It comprises an electric motor 46 coupled to a reduction gear drive unit 47. The output shaft of the gear unit 47 is coupled to an elongated jackscrew 48 along which a nut 49 travels. The power unit 45 is suspended from a support structure 51 comprising a weldment of substantially U-shaped channel construction, the opening of the U being face down. The support structure is provided with a downwardly depending leg portion 52 adapted to be welded or otherwise securely fastened to a raised platform portion 53 of the luggage compartment floor 43. The support structure 51 extends rearwardly of the vehicle body from its place of attachment to the platform 53 and is supported at its rearmost end by the torque tube or shaft 40 which passes through the support structure. The power unit 45 is supported at its front or motor and gear unit end on a pivot stud 54 extending horizontally through the depending leg portion 52 of the support structure 51 near the upper end thereof. The jackscrew end of the power unit 45 is supported on a swinging arm 55 which is journaled at its upper end on a pivot stud 56 extending horizontally through the support structure 51 in parallel relation to and just forward of the torque tube or shaft 39. The lower end of the swinging arm 55 is journaled on a stud 57 projecting laterally from the traveling nut 49. The traveling nut 49 is straddled by and connected to a yoke 58 which, as best seen in FIGS. 5 and 6, is pivotally connected at its upper end by a pivot stud 59 to a substantially horizontally extending arm 61 of a bell crank lever 62, the bell crank lever having an upwardly extending arm 63. The bell crank lever 62 is pivotally connected at the intersection of its two arm portions 61 and 63 by a pivot stud 64 to the free end of a lever 65 which straddles the torque tube or shaft 40 between the side walls of the support structure 51. The lever 65 is securely welded or otherwise coupled to the torque tube or shaft 40 for movement therewith.

The upper end of the vertically upstanding arm 63 of the bell crank lever 62 is coupled by a pivot stud 66 or the like to one end of a longitudinally extending link 67. The link 67 extends in a forward direction beneath the underside of the deck lid structure 13. The link 67 has secured to its forward end an extension 68. The extension 68 is secured to the link 67 by bolts 69, either the link or the extension being provided with slots 71 permitting longitudinal adjustment of the extension relative to the link intermediate its ends. The extension 68 of the link passes through a sleevelike structure 72 welded or otherwise securely fastened to the underside of the reinforcing member 35 secured to the deck lid structure.

It will be noted that the forward end of the extension 68 comes to a point, the upper edge 73 being angularly inclined relative to the lower longitudinal edge 74. Rearwardly of the inclined edge 73 the extension 68 is provided with an upwardly and longitudinally extending projection 75, for a purpose to be hereinafter defined. Overlying the extension 68 in position to straddle the projection 75 are a pair of links 76 maintained in proper spaced relationship relative to one another by suitable spacer devices (not shown). The links are pivotally coupled at their rear end to flanges 77 on the sleeve 72. The links 76 straddle the flanges 77 and are retained thereon by suitable pivot studs 78. Suitable bolts or the like 79 secure the two links 76 to each other intermediate their ends. Forwardly of the bolt 79 the links are provided with downwardly, angularly inclined end portions 81.

As will be more fully explained, the inclined edge 73 of the extension 68 and the downwardly depending end portions 81 of the links 76 are adapted to engage a keeper device, generally designated 82, secured to the rear wall or face 83 of the panel structure 84 separating the vehicle passenger compartment from the luggage or storage compartment. It might be here noted that the distance between opposed surfaces of the spacers carried by the bolts 78 and 79 between the links 76 is substantially equal to the distance between the forward and rear edges of the upstanding projection 75 on the extension 68.

Referring again to FIGS. 3 and 4, it will be noted that a pair of links 85 are provided which extend between brackets 86 mounted on the wheel housing at each side of the storage compartment and the side rails 87 and 88, respectively, of the front or forward section 15 of the roof structure 14. Each link 85 is pivotally connected at 89 to the respective side rail 87 or 88 and is pivotally connected at 91 to the bracket 86 at the respective side of the vehicle. When the rear section 16 of the roof structure 14 is swung upwardly through actuation of the power means, the links 85 are effective to pull the front section downwardly about the pivotal connection or hinge devices 17 connecting the forward section 15 of the roof to the rear section 16. The links 85 swing in the same direction as the arms 35 supporting the rear section of the roof structure.

The weight of the roof structure is counterbalanced during retracting and raising movements by suitable counterbalance means in the form of coil springs 92. There are two of these springs, one located at each side of the storage compartment 44. Each spring is engaged at one end to the free end of a swinging arm 93 welded to the torque tube or shaft 40 and at its other end to a suitable bracket (not shown) welded to the upper surface of the platform portion 53 of the storage compartment floor 43. The springs 92 are placed under increased tension as the roof is raised from the stored position to a fully extended position over the passenger compartment. The springs 92 assist the power mechanism 45 in raising the dead weight of the roof structure 14 when the roof structure is retracted into the storage compartment 44. When the roof structure 14 is lifted from the storage compartment to an extended position over the passenger compartment, the springs 92 counterbalance the weight of the roof structure with increasing resistance as the roof structure opens and descends over the passenger compartment.

An auxiliary package tray device, generally designated 94, is provided to close the gap between the compartment wall 84 and the forward lip 31 of the rear deck lid 13. This gap is created by the retraction of the main package tray 33 with the roof structure 14 into the storage compartment 44. The auxiliary package tray 94 is fabricated of suitably reinforced sheet metal panel sections 95 and 96 hingedly connected to each other by a piano hinge 97 or its equivalent. The two sections 95 and 96, when in coplanar relationship, form a panel of sufficient width to close the gap between the compartment wall 84 and the forward lip 31 of the deck lid 13. In roof raised position the two tray sections 95 and 96 are folded beneath the main package tray 33, as seen in FIG. 1 and in solid outline in FIG. 7.

Figure 7:
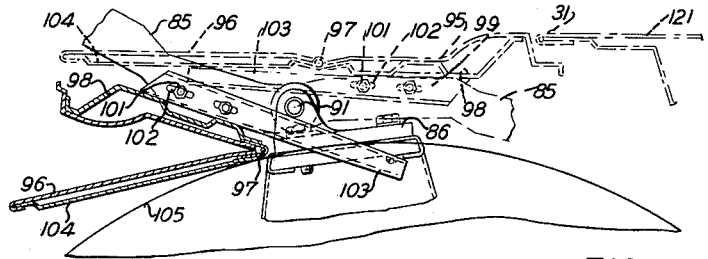
FIG. 7 is an enlarged semidiagrammatic view illustrating the auxiliary package tray in top raised and lowered position.

The auxiliary package tray 94 is supported for movement from folded to extended position in a simple and efficient manner. The reinforcing sheet metal 98 of the tray section 95 is spot welded or otherwise securely fastened to a pair of channel members 99. The channel members 99 are located one at each end of the tray section 95 in position to be secured by bolts 101 or the like to a respective side face of a forward roof section folding or control link 85. The location of the bolts 101 are best seen in FIG. 7. It will be noted that the bolt holes in the member 99 are in the form of elongated slots 102 permitting longitudinal adjustment to be made. It will be noted that the channel members 99 are somewhat longer than the tray sections 95, for a reason to be explained.

In top raised position, the tray section 95 extends across the vehicle body beneath the two control links 85. As the links 85 swing from top raised position to top retracted position, i.e., from the solid outline position shown in FIG. 7 in a clockwise direction about the pivotal connections 91 to the dot and dash outline position, the tray section 95 is carried upwardly and rearwardly to the dot-dash outline position, as shown in FIG. 7, in which it is inverted and positioned above the links 85. The tray section 96 is also carried slightly upwardly and rearwardly through its pivotal connection 97 with the tray section 95. As was stated above, the channel members 99 are somewhat longer than the tray section 95. The overhanging or extended portion 103 of each channel member 99 and the underside of the reinforcing structure 104 of the tray section 96 reach a position in which they abut each other as the tray section 96 dangles or swings freely about its pivotal connection 97 with the upper tray section 95. The extension 103 of the channel member 99 thus carries the tray section 96 upwardly to the position in which it is coplanar with the tray section 95, as shown in dot-dash outline in FIG. 7. When in this coplanar relationship, and after the control links 85 have reached their maximum downward or retracted position, the two tray sections 95 and 96 completely extend across the gap between the compartment wall 84 and the forward lip 31 of the rear deck lid structure, thus forming the auxiliary tray structure 94.

When the roof structure is raised from its stored position to the position in which it extends over the passenger compartment, the tray section 96 is carried by the extension 103 of the channel member 99 until the latter begins to invert. However, shortly before this occurs, the bottom surface of the reinforcing structure 104 of the tray section 96 engages the upper curved surface of the wheel housing 105, as indicated in FIG. 7, so that it is retained in the position substantially as shown in the drawing. As will be noted, the sheet metal forming the outer skin of the tray section 95 may be contoured so as to blend into the vehicle body contours as desired.

Referring now to FIGS. 1, 3, 8 and 9, there is illustrated a preferred construction and arrangement of a mechanism for raising and lowering the rear deck lid 13, the mechanism having associated therewith a latch device for latching the deck lid in lowered or compartment closing position.

The deck lid 13 is supported at its lower rear edge on simple strap hinges 106. It is adapted to be swung upwardly and rearwardly or, in a clockwise direction as viewed in FIG. 1, to provide access to the storage compartment 44. Suitable power operated mechanism is provided for raising the deck lid 13. In the present embodiment, the power operated mechanism comprises a pair of jackscrew devices, each generally designated 107, located at each rear corner of the storage compartment 44. The lower end 108 of each jackscrew device is pivotally mounted on a suitable bracket 109 mounted on the floor 43 of the storage compartment 44. The lifting screw 111 of each jackscrew device 107 is driven through a conventional worm and gear drive (not shown), the worm being driven by a flexible cable 112 driven by a centrally positioned electric motor 113. The electric motor 113 is provided with double ended output shafts so that the single motor may drive the flexible cables which lead to both jackscrew devices 107.

Figure 8:
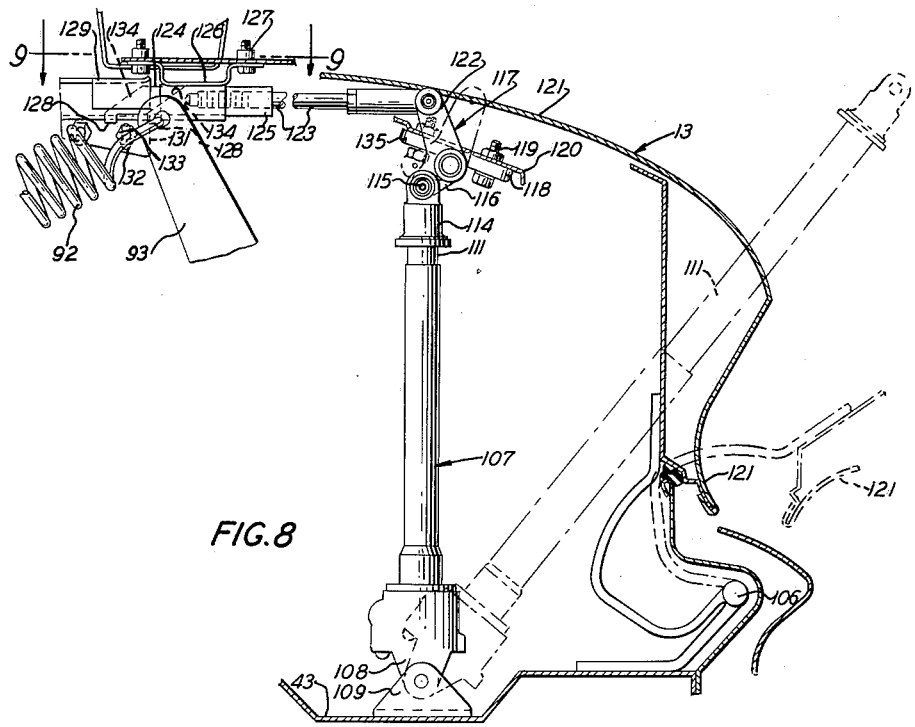
FIG. 8 is an enlarged view illustrating the deck lid raising and lowering linkage and the deck lid latching mechanism associated therewith.
Figure 9:
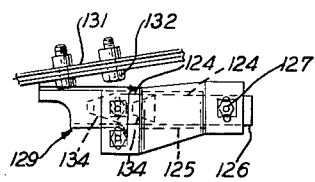
FIG. 9 is a sectional view taken substantially through the line 9—9 of FIG. 8 looking in the direction of the arrows.

The upper end 114 of each lifting screw 111 is pivotally connected at 115 to a depending arm 116 of a bell crank lever generally designated 117. The bell crank lever 117 is pivotally mounted on a suitable bracket 118 held by bolts 119 to the underside of a structural member 120 of the rear deck lid outer shell 121. The bell crank lever 117 is provide with a generally upstanding arm 122. The arm 122 is pivotally connected to one end of a draft link 123 which extends beneath the upper skin structure 121 of the deck lid 13 toward the front edge 31 thereof. The forward end of the draft link 123 is coupled to a slidable latch bolt 124 which is slidably guided in a sleeve 125 welded or otherwise secured to the underside of a channel member 126 bolted or otherwise secured by bolts 127 to the underside of the structural members reinforcing the outer shell 121 of the deck lid 13. As best seen in FIG. 8, the latch bolt is provided with a depending lug 128 which limits the retraction of the latch bolt relative to the sleeve 125.

The latch bolt 124 is adapted to engage a keeper 129 in the form of a sleeve provided with a depending flange portion 131. The flange portion is provided with suitable slots 132 adapted to receive bolts 133 for holding the flange to the side wall of the rear quarter panels 11 and 12, respectively. The latch bolt 124 is provided with a suitably tapered nose portion 134 to provide easy entrance into the keeper sleeve portion 129 thereby compensating for any misalignment of the deck lid structure 13 with the quarter panels 11 and 12.

The operation of the deck lid raising and lowering mechanism and the associated latching mechanism is also relatively simple. With the deck lid structure 13 in lowered position, the lifting screw 111 of the jackscrew device 107 is telescoped within the outer housing of the jackscrew device. Upon rotation of the electric motor 113 in the proper direction, the lifting screw 111 of the jackscrew device 107 moves away from the vehicle storage compartment floor 43. As the screw 111 moves away or upwardly, it swings the bell crank lever 117 in a clockwise direction as viewed in FIG. 8. It will be noted that there is a certain degree of clearance between the end of the arm 116 of the bell crank lever 117 and the opposed surface 135 of the bracket 118, providing, in effect, a lost motion connection. This lost motion connection is for the purpose of permitting the bell crank lever 117 to swing sufficiently far in a clockwise direction to cause retraction of the latch bolt 124 from the keeper device 129 before any attempted lifting force is applied to the deck lid structure 13. With the latch bolt 124 retracted from the keeper 129 and with the bell crank arm 116 engaging the surface 135 of the bracket 118, the lifting force of the lifting screw 111 will then be applied directly to the underside of the rear deck lid. The latter will then be swung upwardly about its pivotal mounting or hinges 106 to the substantially upright position shown in FIG. 2. When this upward swinging movement is completed, a suitable limit switch (not shown) may be actuated to permit operation of the top retracting mechanism when the top is to be retracted or to permit operation of the mechanism when the top is to be removed from the storage compartment and extended over the passenger compartment.

When the deck lid structure is to be lowered or retracted, the electric motor 113 will be energized to rotate the drive cables 112 in a reverse direction and through the power train causing each lifting screw 111 to be retracted within the jackscrew devices 107. Since the weight of the deck lid structure 13 is in a downward direction, the bracket surface 135 will remain in abutting relation to the bell crank arm 116 until the deck lid is completely lowered and its forward lip portion 31 and side portions are engaged with the edges of the quarter panels. When the deck lid structure is down as far as it can go, the lifting screw 111 will continue to pull down on the bell crank lever arm 116 causing the bell crank 117 to be swung in a counterclockwise direction, as viewed in FIG. 8, thereby pushing the draft link 123 to the left causing the bolt to be extended into engagement with the keeper 129. As was stated above, the bolt is provided with a downwardly extending lug 128 which engages the edge portion of the guide sleeve 125 when the deck lid structure is being raised. This prevents the bolt from being retracted too far and also assists in the lockup of the bell crank lever 117 as its arm 116 engages the surface 135 of the bracket 118 so that the force of the lifting screw 111 will be applied directly to the deck lid structure 13.

The foregoing completes the physical description of the structure embodying the present invention, the operation of the auxiliary package tray device and the operation of the deck lid raising or lowering and latching mechanism. The operation of the mechanism for raising and lowering the roof structure and for latching the same in raised position will now be described.

Referring now to FIGS. 1, 5 and 6, it will be assumed that the top structure is in raised position and the power mechanism 45 is to be operated to retract the top structure for storage in the storage compartment 44. It will also be assumed that the deck lid structure 13 has been raised to provide access to the storage compartment. It will be noted that the latch end of the extension 68 of the link 67 is in engagement with keeper device 82, the upper inclined edge 73 thereof underlying a retaining element 136 of the keeper device 82. It will also be noted that the links 76 are in a position in which their front end portions 81 are resting on a lip 137 of the keeper device 82 and the spacer carried between the links 76 by the bolt or stud 79 is resting on top of the projection 75 of the extension 68. Upon operation of the motor 46 to retract the top structure the screw 48 is rotated in a direction to cause movement of the traveling nut 49 toward the front of the vehicle. This causes the arm 55 to be pulled downwardly about its pivot axis 56. The downward movement of the arm 55 is accompanied by downward movement of the yoke 58 which causes the bell crank lever 62 to be swung in a clockwise direction, as viewed in FIGS. 5 and 6, about the pivot stud 64 carried on the end of the arm 65. Correspondingly, the link 67 is pulled to the right as viewed in FIGS. 5 and 6. This causes the latch end portion of the extension 68 to be withdrawn from the keeper device 82 to a position in which the forward bolt or stud 79 of the links 76 is in position to drop down over the forward edge of the projection 75 on top of the extension 68. The bell crank lever 62 is so constructed and arranged that after the initial movement permitting retraction of the latching end of the extension 68 from the keeper 82, the shoulder thereon engages the end of the lever 65 whereby downward movement of the yoke 58 is transmitted directly to the lever 65. As soon as this occurs, force is transmitted from the traveling nut through the yoke 58 to the lever arm 65, causing the latter to be rotated in a clockwise direction as viewed in FIGS. 5 and 6 thereby causing the torque tube or shaft 40 to be rotated in the same direction. As was described, the torque tube 40 is directly coupled to the arms 35 secured to the rear roof structure 15. As the arms 35 are swung in a clockwise direction as viewed in FIG. 1, the entire rear roof section is bodily lifted upwardly. As the roof section 15 moves upwardly the control links 85 exert a downward force on the forward section 14 of the roof structure. This causes the forward section 15 to be pivoted about the hinge connection 17 to the rear roof section 16. FIG. 4 illustrates the relationship of the rear and forward roof sections in an intermediate stage of the folding movement. With reference to FIG. 4, it will be understood that the latching devices 22 for latching the forward roof rail 21 of the forward roof structure 15 to the windshield header had been released, either manually or by power operated means, prior to attempted retraction of the roof structure.

The folding action beyond this point is conventional as in so-called clamshell type retractable roof structures. The rear roof section 16 is swung in a clockwise direction, as viewed in the drawings, to a substantially horizontal position within the storage compartment. The forward roof section 15 is pulled down to overlie the rear roof section 16 and it too assumes a substantially horizontal position within the storage compartment. When the folding action is completed, suitable limit switches may be energized to permit the rear deck lid structure actuating mechanism to be operated to close the deck lid 13 as has been above described.

To raise the roof structure, it is necessary to actuate the power unit 45 to rotate the screw 48 to drive the traveling nut 49 toward the rear of the vehicle. The arm 55 and yoke 58 connected to the traveling nut 49 are then forced upwardly. As the yoke 58 is forced upwardly it tends to swing the bell crank lever 62 in a counterclockwise direction as viewed in FIGS. 5 and 6. It is in this connection that the links 76 form an important feature of the present invention. As soon as the rear roof section 16 is lifted clear of the compartment wall 84 so that the forward ends 81 of the links 76 no longer rest against the top of the lip 137, the links 76 are able to drop down over the projection 75 of the link extension 68, as seen in FIG. 6. The link 67 and its extension 68 are thus immobilized against longitudinal movement relative to the rear roof section 16. With the link 67 immobilized any force exerted by the yoke 58 on the bell crank lever 62 can only be transmitted to the lever 65 causing rotation of the torque tube or shaft 40. The torque tube or shaft 40 is rotated in a counterclockwise direction causing the arms 35 supporting the rear roof section 16 to be similarly rotated. As the rear roof section is bodily raised out of the storage compartment it carries the front roof section 15 along with it. However, since the front roof section is controlled by the links 85, it begins to swing relative to the rear roof section about the pivot hinges 17 so as to swing forwardly toward the windshield header. As the rear roof section 16 approaches its final position, the forward end portions 81 of the links 76 again engage the lip 137 on the keeper device 82. The links 76 are lifted relative to the latch end of the extension 68 so that the blocking spacer carried by the bolt 79 is moved out of the path of the forward end of the projection 75 on the top of the link 68. The links 68 and 67 are thus no longer blocked against movement in a forward direction. The bell crank lever 62 then becomes movable relative to the arm 65. Continued upward movement of the yoke 58 is then transmitted through the bell crank lever 62 to the links 67 and its extension 68. Since the upper edge of the latching end of the link 68 is provided with the angularly inclined surface 73, it engages the underside of the lip 136 of the keeper device 82 and pulls the rear roof section 16 down into a rigidly retained position relative to the top of the vehicle body structure. When this latching action is completed, the roof structure will be in a properly oriented position relative to the body. The forward latching devices 22 may then be latched to engage the roof rail 21 with the windshield header and the deck lid may then be closed.

It will be understood that the invention is not to be limited to the exact construction shown and described, but that various changes and modifications may be made without departing from the spirit and scope of the invention, as defined in the appended claims.

1. In a motor vehicle body having a passenger compartment and a storage compartment to the rear thereof, a retractable sectional roof structure extendible in raised position over said passenger compartment, said roof structure comprising rigid roof sections hinged to one another for folding movement into said storage compartment, the rearmost one of said sections being an integrated structure comprising side rails, roof rails and a panel means extending between said side rails, said panel means in roof raised position extending across said passenger compartment at the lower ends of said side rails, spaced arm means attached to said panel means therebeneath inwardly of said side rails and extending into said storage compartment, a shaft means, means coupling said arm means to said shaft means, means rotatably supporting said shaft means in said storage compartment below and rearwardly of said roof structure in raised position of the latter, power operated means operable to turn said shaft to swing said arms to bodily transport said roof structure from top raised position to top lowered position within said storage compartment, and means adapted to fold said roof structure as the latter swings about the pivot axis of said shaft means, said last mentioned means comprising a pair of control links extending between said body and the roof section hinged to said rearmost roof section, and a second panel means carried by said control links, said second panel means being beneath said links in roof raised position, said control links being inverted as said roof structure is swung into said storage compartment and said second panel means being swung into position to close the opening created by movement of said first mentioned panel means with said rearmost roof section.

2. In a motor vehicle body having a passenger compartment and a storage compartment to the rear thereof separated by a partition means, a roof structure retractable from a normal raised position to a stored position in said storage compartment, swingable arms supporting said roof structure, said swingable arms being coupled to shaft means rotatably supported on said body, lever means coupled to said shaft means, a lost motion linkage system coupled to said lever means, latch means carried by said roof structure, said latch means in roof raised position being engaged with a keeper device on said partition means, said latch means being coupled to said lost motion linkage system for operaton thereby, and power operated means coupled to said lost motion linkage system, said power operated means being operative in roof structure raised position to move said lost motion linkage system in latch means disengaging direction, said lost motion linkage system upon completion of the unlatching movement then becoming operative to swing said lever means to turn said shaft means and thereby swing said swingable arms in roof structure retracting direction.

3. In a motor vehicle body having a passenger compartment and a storage compartment to the rear thereof separated by a partition means, a roof structure retractable from a normal raised position to a stored position in said storage compartment, swingable arms supporting said roof structure, said swingable arms being coupled to shaft means rotatably supported on said body, lever means coupled to said shaft means, a lost motion linkage system coupled to said lever means, retractable latch means carried by said roof structure engageable in raised position of the latter with a keeper device on said partition means, said latch means being coupled to said lost motion linkage system, power operated means coupled to said lost motion linkage system and effective in roof structure raised position to move the latter in a direction to retract said latch means from said keeper device, said lost motion linkage system upon completion of the retracting movement of the latching means becoming effective to swing said lever means to turn said shaft means and thereby swing said swingable arms in roof structure retracting direction, and means engageable with said latch means to hold the same in retracted position during swinging movement of said roof structure from a raised to a stored position and vice versa.

4. In a motor vehicle body having a passenger compartment and a storage compartment to the rear thereof separated by a partition means, a roof structure retractable from a normal raised position to a stored position in said storage compartment, swingable arms supporting said roof structure, said swingable arms being coupled to shaft means rotatably supported on said body, lever means coupled to said shaft means, a lost motion linkage system coupled to said lever means, retractable latch means carried by said roof structure engageable in raised position of the latter with a keeper device on said partition means, said latch means being coupled to said lost motion linkage system, power operated means coupled to said lost motion linkage system and effective in roof structure raised position to move the latter in a direction to retract said latch means from said keeper device, said lost motion linkage system upon completion of the retracting movement of the latching means becoming effective to swing said lever means to turn said shaft means and thereby swing said swingable arms in roof structure retracting direction, and means engageable with said latch means to hold the same in retracted position during swinging movement of said roof structure from a raised to a stored position and vice versa, said last mentioned means engaging said keeper device first upon completion of a substantial degree of raising movement of said roof structure to thereby become disengaged from said latch means to enable the latter to be urged into engagement with said keeper device by said lost motion linkage system upon said roof structure becoming fully raised.

5. In a motor vehicle body structure having a roof structure retractable from a raised position to a stored position, said roof structure comprising roof sections hinged to one another for folding movement during retraction to said stored position, one of said roof sections having a package tray structure retractable therewith, control links pivotally connected to said body structure and the other of said roof sections, said control links being swingable from a forwardly extending roof structure raised position to a rearwardly extending roof structure stored position, said control links controlling the folding of said other roof section relative to said one section during swinging movement thereof, and an auxiliary package tray carried by said control links and comprising a first section fastened to said control links and a second section hinged to said first section for free swinging movement, said second section being folded beneath said first section in roof structure raised position, said auxiliary tray being bodily carried upwardly into an inverted operative position by said control links as the latter are swung from said forwardly extending roof structure raised position to said rearwardly extending roof structure folded and stored position, said second section being unfolded relative to said first section during swinging movement of said control links and said auxiliary package tray fitting into the space normally occupied by the package tray structure retractable with said one roof section.

6. In a motor vehicle body structure having a roof structure retractable from a raised position to a stored position, said roof structure comprising roof sections hinged to one another for folding movement during retraction to said stored position, one of said roof sections having a package tray structure retractable therewith, control links pivotally connected to said body structure and the other of said roof sections, said control links being swingable from a forwardly extending roof structure raised position to a rearwardly extending roof structure stored position, said control links controlling the folding of said other roof section relative to said one section during swinging movement thereof, and an auxiliary package tray carried by said control links and comprising a first section fastened to said control links and a second section hinged to said first section for free swing movement, said second section being folded beneath said first section in roof structure raised position, said auxiliary tray being bodily carried upwardly into an inverted operative position by said control links as the latter are swung from said forwardly extending roof structure raised position to said rearwardly extending roof structure folded and stored position, said second section being unfolded relative to said first section during swinging movement of said control links and said auxiliary package tray fitting into the space normally occupied by the package tray structure retractable with said one roof section, and means on said body structure guiding said second section into folded position beneath said first section upon swinging movement of said control links from roof structure stored position to roof structure raised position.

7. In a retractable roof structure for a motor vehicle body, a pair of laterally spaced support arms attached to said roof structure, means supporting said roof structure for swinging movement about an axis located below and rearwardly of said roof structure in its raised position, movable latch means carried by said roof structure, keeper means on said body engageable by said latch means to lock said roof structure in its raised position to said vehicle body, power means for swinging said arms upwardly and rearwardly about said axis to bodily invert and transport said roof structure into a stored position within said vehicle body, said power means including sequentially movable members effective to first unlatch said latch means and then effectuate swinging movement of said arms, and means carried by said roof structure engageable with said latch means to retain the latter in unlatched position during movement of the roof structure from raised position toward stored position and vice versa, said retaining means abutting a member on said vehicle body immediately prior to restoration of said roof structure to fully raised position to release said latch means for actuation by said sequentially movable members to lock said roof structure in raised position.

8. In a motor vehicle body, a retractable rigid roof structure for said body, said roof structure having a rear section of unitized construction comprising side rails, roof rails and a package tray means extending laterally across said body between said side rails, latch means carried beneath said package tray means locking said rear section in raised position of said roof structure to said vehicle body, swingable arm means attached to said package tray means therebeneath, means coupling said arm means to a rotatably supported shaft means, power means, and sequentially movable members coupled to said power means for sequentially unlatching said latch means and turning said shaft means to swing said arms to bodily transport said rear section from roof structure raised to roof structure lowered position within said body.

9. In a motor vehicle body, a retractable rigid roof for said body, said roof having a rear section of unitized construction comprising side rails, roof rails and a package tray means extending laterally across said body between said side rails, latch means carried beneath said package tray means locking said rear section in raised position of said roof to said vehicle body, swingable arm means attached to said package tray means therebeneath, means coupling said arm means to a rotatably supported shaft means, power means, sequentially movable members coupled to said power means for sequentially unlatching said latch means and turning said shaft means to swing said arms to bodily transport said rear section from roof raised to roof lowered position within said body, and means carried by said roof engageable with said latch means to retain the latter in unlatched position during movement of the roof from raised position toward stored position and vice versa.

References Cited in the file of this patent

UNITED STATES PATENTS

| | | |
|---|---|---|
| 1,975,701 | Poos | Oct. 2, 1934 |
| 2,007,873 | Paulin | July 9, 1935 |
| 2,623,779 | Catell | Dec. 30, 1952 |
| 2,715,545 | Orr | Aug. 16, 1955 |
| 2,796,288 | Green | June 18, 1957 |
| 2,800,361 | Kubacka | July 23, 1957 |
| 2,837,372 | Odom | June 3, 1958 |
| 2,856,231 | Zeman | Oct. 14, 1958 |